No. 695,628. Patented Mar. 18, 1902.
C. R. SCHLIEPER.
FASTENING DEVICE.
(Application filed Dec. 28, 1901.)
(No Model.)

Witnesses:
C. A. Williams
James C. Herron.

Inventor:
Charles Raymond Schlieper
by John H. Roney
his Attorney.

UNITED STATES PATENT OFFICE.

CHARLES RAYMOND SCHLIEPER, OF ELLIOTT, PENNSYLVANIA, ASSIGNOR OF ONE-HALF TO EDWARD E. ERIKSON, OF PITTSBURG, PENNSYLVANIA.

FASTENING DEVICE.

SPECIFICATION forming part of Letters Patent No. 695,628, dated March 18, 1902.

Application filed December 28, 1901. Serial No. 87,535. (No model.)

*To all whom it may concern:*

Be it known that I, CHARLES RAYMOND SCHLIEPER, residing at Elliott borough, in the county of Allegheny and State of Pennsylvania, have invented a new and useful Improvement in Fastening Devices, of which improvement the following is a specification, reference being had therein to the accompanying drawings, in which—

Figure 1:
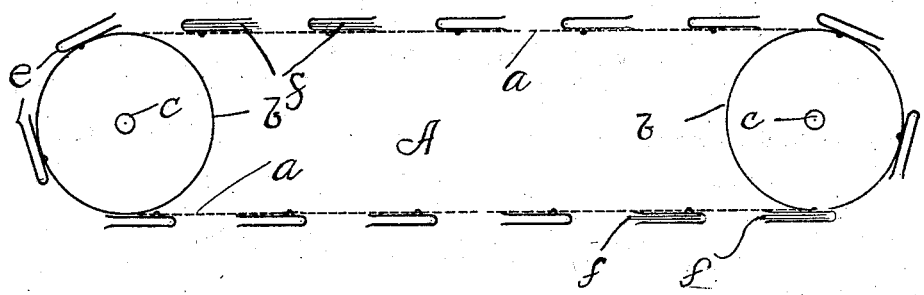
Figure 2:
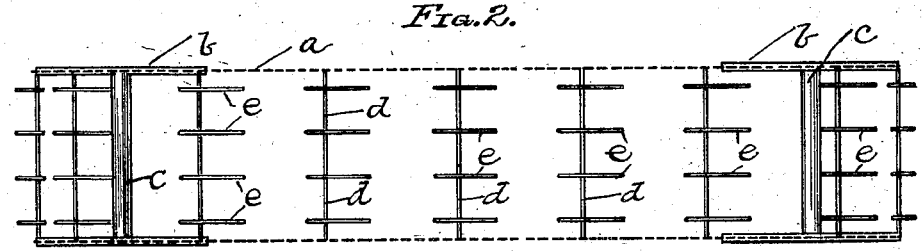
Figure 3:
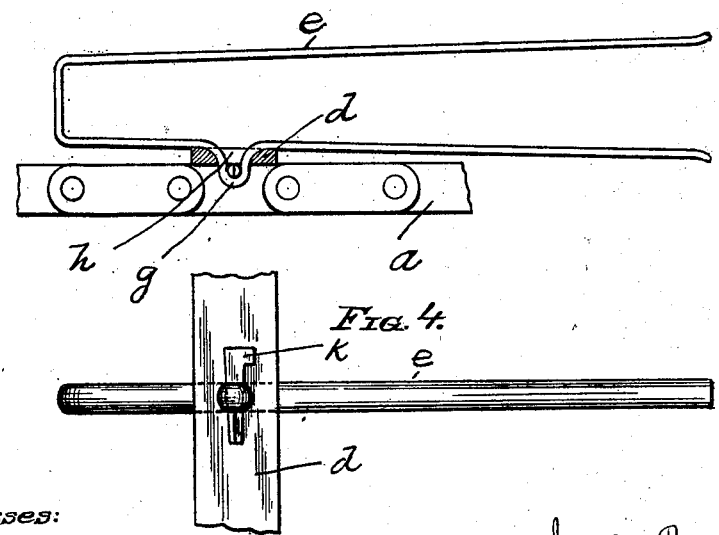

Figure 1 indicates a side elevation of an apparatus carrying tin-plate through the branning-trough, showing my improved fastening device or clip applied thereto. Fig. 2 is a plan view of the same. Fig. 3 is an enlarged detail showing my improved fastening device and a portion of the conveyer-chain. Fig. 4 is an inverted plan view of the same.

My invention relates to improvements in mechanism for fastening brackets and similar devices upon stationary supports, and particularly to improved means for fastening brackets or supports for carrying tin-plate, metal sheets, or other similar objects; and to this purpose my invention consists in the novel construction and arrangement of parts hereinafter described, reference being had to the accompanying drawings, which form a part of this specification, in which like reference characters indicate like parts wherever they occur.

Referring to said drawings, A is an apparatus or conveyer for carrying tin-plate after the same has been annealed, galvanized, or tinned and comprises an endless chain or chains $a$, operating over drums $b$, which are mounted upon shafts $c$ and driven in any suitable manner. Said chains are connected by bars $d$, transversely disposed, to which are secured series of brackets $e$ for the support of the tin-plate $f$. The said bracket $e$ comprises a U-shaped bar, the side of which is adjacent to the transverse bars to which it is connected having a horizontally-disposed U-shaped loop $g$, adapted to project through an orifice $h$, preferably square in cross-section, formed in the cross-bars of the carrier. A split pin or bolt $k$ is inserted between or in the U-shaped loop $g$ and engages against the rear face of the plate attached to the carrier.

Heretofore, so far as I am aware, in devices of this general character it has been usual to weld a lug upon the U-shaped bracket at right angles thereto, which lug was provided with bolt or rivet orifices for securing the same to the cross-bars of the carrier. This manner of attachment of the bracket to the cross-bar of the carrier was annoying and inefficient, for the reason that the bracket invariably became loose at the place where the same was riveted or attached to the cross-bar. My improvement makes this impossible, obviates the necessity of welding the lug upon the bracket to attach the same to the cross-bar, thus making a very cheap, simple, and efficient fastener or support.

Having described my invention, what I claim, and desire to secure by Letters Patent, is—

1. A fastening device comprising a bar provided with a loop, a plate or bar having an orifice therein adapted to receive said loop, and a pin adapted to be inserted in said loop and straddle the orifice in said bar or plate.

2. A support for carrying tin-plate or metal plates comprising a bracket, one member of which is provided with a horizontally-disposed loop, in combination with a plate or bar having an opening or perforation therein adapted to receive said loop, and a split pin adapted to be inserted in said loop and straddle the opening in said plate or bar.

In testimony whereof I have hereunto signed my name in the presence of two subscribing witnesses.

CHARLES RAYMOND SCHLIEPER.

In presence of—
   CLARENCE A. WILLIAMS,
   JOHN H. RONEY.